US006842484B2

(12) United States Patent
Gandhi et al.

(10) Patent No.: US 6,842,484 B2
(45) Date of Patent: Jan. 11, 2005

(54) METHOD AND APPARATUS FOR RANDOM FORCED INTRA-REFRESH IN DIGITAL IMAGE AND VIDEO CODING

(75) Inventors: Bhavan Gandhi, Vernon Hills, IL (US); Kevin O'Connell, Palatine, IL (US); David Nicozisin, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 750 days.

(21) Appl. No.: 09/902,438

(22) Filed: Jul. 10, 2001

(65) Prior Publication Data

US 2003/0016754 A1 Jan. 23, 2003

(51) Int. Cl.[7] .............................................. H04N 7/12
(52) U.S. Cl. ............................................. 375/240.24
(58) Field of Search ...................... 375/240.01, 240.08, 375/240.24, 240.26; H04N 7/12

(56) References Cited

U.S. PATENT DOCUMENTS

| 5,491,509 A | 2/1996 | Jeong et al. ................ 348/402 |
| 5,724,369 A | 3/1998 | Brailean et al. ............. 371/31 |
| 6,025,888 A | 2/2000 | Pauls ...................... 348/845.1 |

OTHER PUBLICATIONS

Steinbach, Eckehard et al. "Standard Compatible Extension of H.263 for Robust Video Transmission in Mobile Environments." *IEEE Transactions on Circuits and Systems for Video Technology.* vol. 7, No. 6, Dec. 1997: 872–881.

Liao, Judy Y. et al. "Adaptive Intra Block Update for Robust Transmission of H.263." *IEEE Transactions on Circuits and Systems for Video Technology.* vol. 10, No. 1, Feb. 2000: 30–35.

*Primary Examiner*—Young Lee
(74) *Attorney, Agent, or Firm*—Kenneth A. Haas

(57) ABSTRACT

A method and apparatus for reducing error propagation in digital video signals using random forced intra-refresh of macroblocks. One or more predetermined regions are defined for each digital video frame. Within each predetermined region, a number of macroblocks are selected according to a random permutation of the macroblocks within the region. The selected macroblocks are intra-coded, while the remaining macroblocks are coded according to a standard video compression protocol. This approach provides an efficient method for mitigating error propagation in a decoder. Interior regions may be smaller than exterior regions, providing higher quality for the interior regions, where sensitivity to errors is higher.

15 Claims, 7 Drawing Sheets

REGION 3　REGION 1

| 0 | 1 | 2 | 3 | 4 | 5 | 6 | 7 | 08 | 09 | 10 |
|---|---|---|---|---|---|---|---|---|---|---|
| 11 | 12 | 13 | 14 | 15 | 16 | 17 | 18 | 19 | 20 | 21 |
| 22 | 23 | 24 | 25 | 26 | 27 | 28 | 29 | 30 | 31 | 32 |
| 33 | 34 | 35 | 36 | 37 | 38 | 39 | 40 | 41 | 42 | 43 |
| 44 | 45 | 46 | 47 | 48 | 49 | 50 | 51 | 52 | 53 | 54 |
| 55 | 56 | 57 | 58 | 59 | 60 | 61 | 62 | 63 | 64 | 65 |
| 66 | 67 | 68 | 69 | 70 | 71 | 72 | 73 | 74 | 75 | 76 |
| 77 | 78 | 79 | 80 | 81 | 82 | 83 | 84 | 85 | 86 | 87 |
| 88 | 89 | 90 | 91 | 92 | 93 | 94 | 95 | 96 | 97 | 98 |

REGION 4　REGION 2

*FIG. 4*

METHOD AND APPARATUS FOR RANDOM FORCED INTRA-REFRESH IN DIGITAL IMAGE AND VIDEO CODING

TECHNICAL FIELD

This invention relates to techniques and apparatus for image and video coding, and in particular to encoder-based methods for containing errors in block-based video CODECs.

BACKGROUND OF THE INVENTION

Block-based video compression standards such as H.261, H.263, MPEG1, MPEG2, and MPEG4 achieve efficient compression by reducing both temporal redundancies between video frames and spatial redundancies within a video frame. An intra-coded frame is self-contained and only reduces spatial redundancies within a video frame. Inter-coded frames, however, are predicted via motion compensation from previously coded frames to reduce temporal redundancies. The difference between the inter-coded video frame and its corresponding prediction is coded to reduce spatial redundancies. This methodology achieves high compression efficiency. However, the inter dependency between frames makes the coded bit-stream more susceptible to propagating channel errors. Errors introduced in the compressed bit-stream will result in errors in the reconstructed video frames. Due to the interdependent coding nature of a video frame, errors have the tendency of being propagated from one frame to another.

Any given macroblock (MB) within an inter-coded frame (i.e., Predicted frame (P-frame) or Bidirectionally predicted frame (B-frame)) may be coded as an intra macroblock. Similar to intra-coded frames, an intra macroblock is coded independently of data from a previously coded frame. The method of forcing macroblocks to be intra-coded is referred to as encoder intra-refresh. There are two main reasons for performing intra-refresh—inverse discrete cosine transform (IDCT) mismatch control and error resilience.

To control IDCT mismatch within the context of the H.261 and H.263 block-based video coding standards, each macroblock location in an image must be intra-coded at least once every 132 times that coefficients are transmitted for that macroblock. The intent of this is to limit the extent of error propagation due to DCT/IDCT mismatch. In other standards, the intra-coding rate is not specified.

To improve error resilience, selected macroblocks are forced to be intra-coded to limit error propagation resulting from using corrupt macroblocks that have been incorrectly reconstructed or concealed due to channel errors. These corrupt macroblocks may at times be visually objectionable. Furthermore, correctly decoded macroblocks from subsequent frames referencing back to a corrupt macroblock for temporal prediction may also be visually objectionable. These type of artifacts are typically more objectionable than the DCT/IDCT mismatch errors. As such, they drive the intra refresh strategy when communicating data over error-prone channels. A good intra-refresh strategy in the encoder will help limit error propagation in the decoder. This is done at the expense of generating more bits for intra-coding a macroblock.

Several methods have been disclosed in the prior art for determining intra-code refresh intervals. The different methods vary in both effectiveness/quality and computational complexity.

E. Steinbach, N. Farber, and B. Girod, "Standard Compatible Extension of H.263 for Robust Video Transmission in Mobile Environments," IEEE Transactions on Circuits and Systems for Video Technology, Vol. 7, No. 6, pp. 872–881, December 1997, discuss a back channel method for communicating corrupted group of blocks (GOBs) identified by the decoder to the encoder. In the context of existing video standards, a GOB is defined as a row of macroblocks. The encoder then tags these GOBs for intra-refreshing. Once the corresponding macroblocks have been intra-refreshed, the probability of limiting the error propagation increases. Although this is an effective method for intra-refreshing corrupt GOBs, it requires an active back channel in a two-way video communication application to be effective. Furthermore, there is a round trip delay introduced from when an error was injected into the bit-stream, detected by the decoder, and communicated to the encoder. There is an inherent propagation of error until the information is used by the encoder to intra-refresh the associated GOBs. Also, the back channel mechanism is rendered ineffective in video streaming applications where an existing encoded bit-stream is transmitted to a decoder.

J. Y Liao and J. Villasenor, "Adaptive Intra Block Update for Robust Transmission of H.263" IEEE Trans. On Circuits and Systems for Video Technology, Vol. 10, No. 1, pp. 30–35, February 2000, describe an adaptive intra-refresh strategy based on determining the sensitivity of a macroblock to errors. This error sensitivity metric is used to decide whether a macroblock should be intra-coded. One advantage of this method is that there is no need for a decoder to communicate information to an encoder over a back channel. A disadvantage of this approach is the added computational complexity introduced by the method. A statistical history of each macroblock is gathered and an error metric is computed based in part on its activity (i.e., number of bits generated), its location from a resynchronization marker, and the properties of the co-located macroblock from previously coded frames.

U.S. Pat. No. 6,025,888, issued on Feb. 15, 2000 to R. J. Pauls, entitled "Method and Apparatus for Improved Error Recovery in Video Transmission over Wireless Channels," discloses a method for intra refreshing a macroblock based on the elapsed time since last intra coding of the macroblock position. A prescribed number of macroblocks with the longest elapsed time since last intra coding are forced intra-coded. The advantage of this method is that no back channel communication between a decoder and an encoder is necessary. However, this method requires keeping a running counter for each macroblock location to tag the macroblocks that should be intra-coded.

U.S. Pat. No. 5,491,509, issued on Feb. 13, 1996 to J. Jeong et al., entitled "Forced Intra-Frame Coding Method," discloses a non-standards approach of having a vertical coding order of macroblocks. Lines of macroblocks spaced by a vertical interval are tagged for forced intra-coding. The intra-coded lines of macroblocks are shifted down one line from one frame to the next. The disadvantage of this approach is the non-standard compliance of the coding order. Another disadvantage of this approach is the large number of macroblocks that are forced intra-coded for each frame. This will generate more bits for the same video quality.

U.S. Pat. No. 5,724,369 issued on Mar. 3, 1998 to J. C. Brailean, K. J. O'Connell, M. R. Banham, and S. N. Levine, entitled "Method and Device for Concealment and Containment of Errors in a Macroblock-based Video Codec", discloses an intra refresh method wherein the macroblock intra-coding order is defined by a number of scan lines. Similar to the previously disclosed techniques, one advantage of this method is that no back channel communication is required between a decoder and an encoder. Another advantage of this method is that it is a pre-determined intra-refresh strategy. Macroblocks are identified for intra-coding based on the frame identification (i.e. frame number or time instance). A major disadvantage of this technique is the regularity of the plurality of scan-lines. Since macroblock locations are intra-coded in a regular pattern from one frame to the next, a visually objectionable quality variation is observed. This regular intra refresh artifact detracts from the overall quality and content of a video sequence.

In light of the foregoing, there is an unmet need in the art to have a general-purpose, low complexity macroblock-based intra-refresh approach that takes advantage of the IDCT mismatch control and error resilience benefits inherent in intra-refresh while overcoming the problems with the prior art discussed above. This approach would preferably be applicable to arbitrary picture sizes without requiring corresponding hardware changes.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 4 shows a partitioning of a QCIF pictured partitioned in four spatial regions according to one embodiment of the invention.

DETAILED DESCRIPTION OF THE INVENTION

Figure 1:
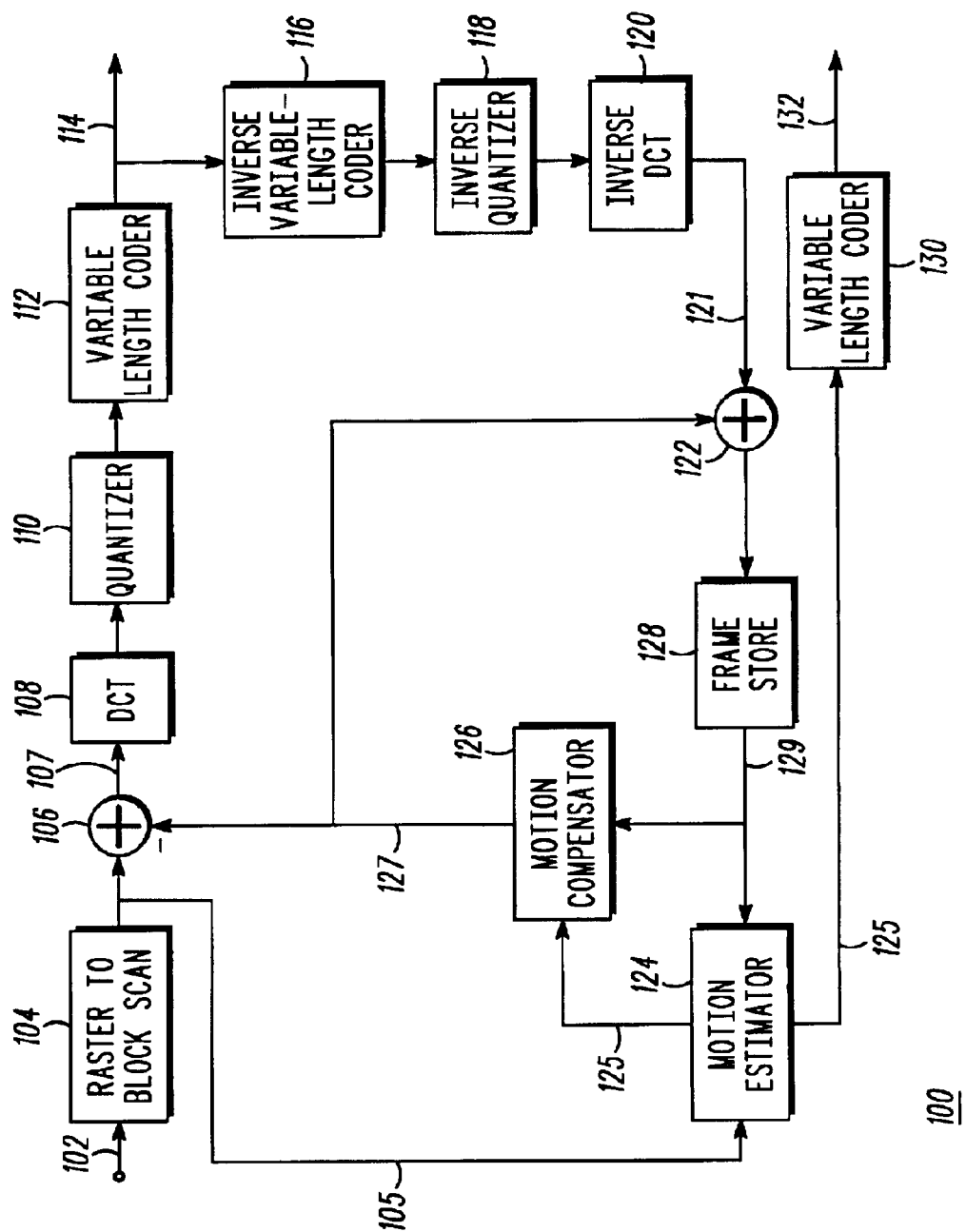
FIG. 1 is a simplified block diagram of an exemplary block-based video coder configured for inter-coding.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

FIG. 1 is a simplified block diagram of an exemplary block-based video coder 100 configured for inter-coding macroblocks. The input 102 is typically a sequence of values representing the luminance (Y) and color difference (Cr and Cb) components of each pixel in each image. Other color schemes, such as Y, U, V, may also be used without departing from the spirit and scope of the invention. The sequence of pixels may be ordered according to a raster (line by line) scan of the image. At block 104 the sequence of pixels is reordered so that the image is represented as a number of macroblocks of pixels. In a 4:2:0 coding system, for example, each macroblock is 16 pixels by 16 pixels. In video, the images often change very little from one image to the next, so many coding schemes use inter-coding, in which a motion compensated version 127 of the previous image is subtracted from the current image at 106, and only the difference image 107 is coded. The luminance (Y) macroblock is divided into four 8×8 sub-blocks, and a Discrete Cosine Transform (DCT) is applied to each sub-block at 108. The color difference signals (Cr and Cb) are sub-sampled both vertically and horizontally and the DCT of the resulting blocks of 8×8 pixels is applied at 108. The DCT coefficients are quantized at quantizer 110 to reduce the number of bits in the coded DCT coefficients. Variable length coder 112 is then applied to convert the sequence of coefficients to a serial bit-stream and further reduce the number of bits in the coded DCT coefficients 114.

In order to regenerate the image as seen by a decoder, an inverse variable-length coder 116, an inverse quantizer 118 and an inverse DCT 120 are applied to the coded DCT coefficients 114. This gives a reconstructed difference image 121. The motion compensated version 127 of the previous image is then added at 122 to produce the reconstructed image. The reconstructed image is stored in frame store 128. The previous reconstructed image 129 and the current blocked image 105 are used by motion estimator 124 to determine how the current image should be aligned with the previous reconstructed images so as to minimize the difference between them. Parameters describing this alignment are passed to variable-length coder 130 and the resulting information 132 is packaged with the DCT coefficients 114 and other information to form the final coded image. Motion compensator 126 is used to align the previous reconstructed image and produces motion compensated previous image 127.

In this inter-coding approach, each coded image depends upon the previous reconstructed image, so an error in a single macroblock will affect subsequent macroblocks. In order to mitigate this problem, macroblocks may be intra-coded periodically, i.e. coded without reference to any other macroblock. When a macroblock is intra-coded, no previous or old data is required to decode it. The decoder can discard old information so the coded sequence is said to be intra-refreshed.

Figure 2:
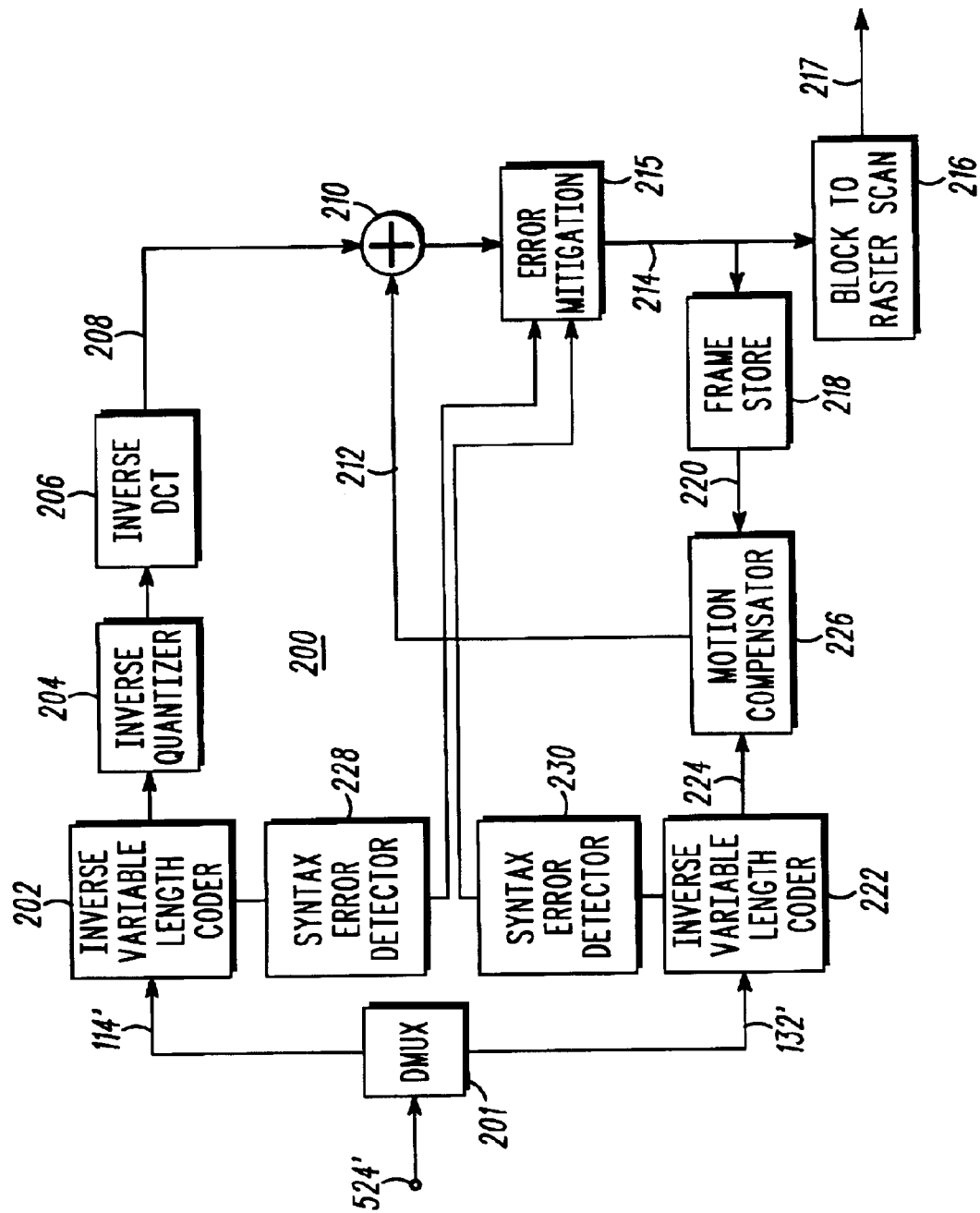
FIG. 2 is a simplified block diagram of an exemplary block-based video decoder.

An exemplary decoder 200, suitable for use with the encoder 100 of FIG. 1, is shown in FIG. 2. The input bit-stream 524' (the apostrophe is used to indicate the signal may contain bit errors) may be modified from the bit-stream produced by the coder by transmission or storage errors that alter the signal. Demultiplexer 201 separates the coefficient data 114' and the motion vector data 132' from other information. The input 114' may be modified from the output 114 from the coder by transmission or storage errors. The image is reconstructed by passing the data through an inverse variable-length coder 202, an inverse quantizer 204 and an inverse DCT 206. This gives the reconstructed difference image 208. The inverse variable-length decoder 202 is coupled to a syntax error detector 228 for identifying errors in the coefficient data 114'. The coded motion vector 132' may be modified from the output 132 from the coder by transmission or storage errors that alter the signal. The coded motion vector is decoded in inverse variable-length coder 222 to give the motion vector 224. The inverse variable-length decoder 222 is coupled to a syntax error detector 230 for identifying errors in the coded motion vector 132'. The previous motion compensated image 212 is generated by motion compensator 226 using the previous reconstructed image 220 and the motion vector 224. The motion compensated version 212 of the previous image is then added at 210 to produce the reconstructed image. Error mitigation may be applied at 215 before the reconstructed image 214 is stored in frame store 218. Error mitigation is concerned with taking steps to conceal errors identified by syntax error detectors 228 and 230. Error mitigation at block 215 is accomplished taking into account the previous reconstructed image 220 and, optionally, information from motion vector 224. The sequence of pixels representing the reconstructed image 214 may then be converted at 216 to a raster scan order to produce a signal 217 that may be presented to a visual display unit for viewing.

Figure 3:
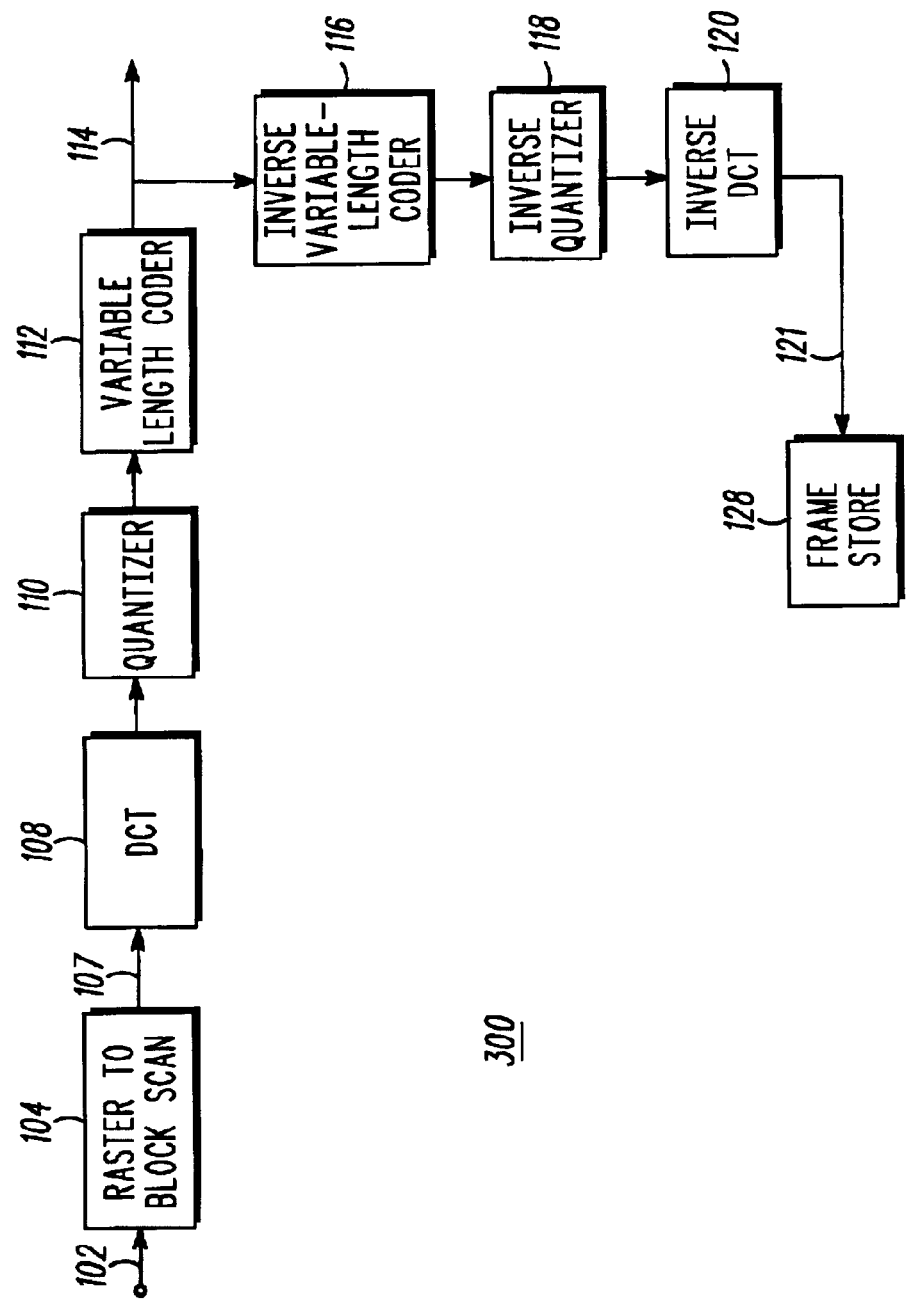
FIG. 3 is a simplified block diagram of an exemplary block-based video coder configured for intra-coding.

FIG. 3 is a simplified block diagram of an exemplary block-based video coder 300 configured for intra-coding. The input 102 is typically a sequence of values representing the luminance (Y) and color difference (Cr and Cb) components of each pixel in each image. The sequence of pixels may be ordered according to a raster (line by line) scan of the image. At block 104 the sequence of pixels is reordered so that the image is represented as a number of macroblocks of pixels. In a 4:2:0 coding system, for example, each macroblock is 16 pixels by 16 pixels. When configured for intra-coding, as shown in FIG. 3, the previous frame is not utilized and no motion estimation is made. The DCT of the resulting blocks of 8×8 pixels is applied at 108. The DCT coefficients are quantized at quantizer 110 to reduce the number of bits in the coded DCT coefficients 114. Variable-length coder 112 is then applied to convert the sequence of coefficients to serial bit-stream and further reduce the number of bits in the coded DCT coefficients 114.

In order to regenerate the image as seen by a decoder, an inverse variable-length coder 116, an inverse quantizer 118 and an inverse DCT 120 are applied. The resulting reconstructed image is stored in frame store 128 for use with the inter-coding of macroblocks from future frames.

The coder may be configured to intra-code or inter-code each macroblock. The method by which the configuration is determined constitutes one aspect of the invention and will now be described.

According to an embodiment of the invention, the picture data is spatially partitioned into one or more mutually exclusive image regions that cover the entire or complete image. In the simplest embodiment, the whole picture is taken to be a single region. In the more general embodiment, a plurality of regions are defined. The region boundaries are defined so they fall on macroblock boundaries. According to another embodiment of the invention, the picture data is spatially partitioned into one or more overlapping image regions that cover the entire image. Moreover, it is envisioned that some combination of these two, such as some overlapping regions in conjunction with mutually exclusive image regions to cover the entire image may be employed.

The macroblocks at a pseudo-random set of locations within each defined spatial region are intra-coded. Remaining macroblocks are either inter-coded or intra-coded according to the specified compression standard. All of the necessary elements of this technique can be pre-defined and implemented as simple look-up-tables during the frame coding process. Alternatively, the pseudo-random macroblock locations may be selected according to a random number generator.

Quarter Common Intermediate Format (QCIF) is a video format defined in the art, such as the ITU-T Recommendation H.261, that is characterized by 176 luminance pixels on each of 144 lines, with half as many chrominance or color difference pixels in each direction for the 4:2:0 coding system format. QCIF thus has one-fourth as many pixels as the full common intermediate format. FIG. 4 shows an example of partitioning a QCIF (144 lines×176 pixels, corresponding to 99 macroblocks) image into four mutually exclusive image regions marked REGION 1, REGION 2, REGION 3 and REGION 4. Region boundaries are defined so as not to split an individual macroblock. As such, region boundaries coincide with macroblock boundaries. REGION 1 and REGION 2 each contain 32 macroblocks and span the edge macroblocks of the image frame, whereas REGION 3 and REGION 4 contain 18 and 17 macroblocks respectively and span the interior macroblocks of the image frame. Since the edge regions span more macroblocks than the interior regions, updating the same number of macroblocks in an image region each frame will result in a quicker intra-refresh of the interior regions than the edge regions. This is desirable, since error at the edges of the image tend to less noticeable than errors in the interior of the image.

In the preferred embodiment, the macroblocks in each image region are selected for intra-coding by stepping through a pre-defined array of pseudo-random macroblock locations. An array of pseudo-random macroblock locations is defined for each image region and for each image size. These macroblock locations (i.e., macroblock addresses) are determined and loaded into a bank of registers prior to coding each frame. An exemplary set of pseudo-random macroblock location arrays for a QCIF sized picture is

---

QCIF_Region1 =
 { 45, 44, 20, 56, 23, 22, 3, 66, 7, 4, 2, 10, 13, 18, 5, 12, 9, 15,
  1, 67, 14, 11, 6, 34, 16, 0, 8, 33, 19, 55, 17, 21 },
QCIF_Region2 =
 { 94, 90, 88, 42, 81, 76, 31, 92, 65, 82, 91, 54, 75, 85, 32, 64,
  79, 86, 77, 53, 89, 80, 84, 78, 95, 83, 98, 87, 93, 96, 43, 97 },
QCIF_Region3 =
 { 48, 49, 41, 26, 37, 28, 35, 24, 38, 25, 47, 27, 40, 30, 36,
  46, 39, 29 }
3 and
QCIF_Region4 =
 { 62, 73, 74, 60, 70, 59, 69, 61, 52, 63, 58, 57, 50, 72, 71, 51, 68
 }.

The arrays are preferably permutations of the block numbers in each region, so that each block within a region is refreshed at the same rate.

The QCIF random macroblock access arrays specify the order in which the macroblocks are intra refreshed for each region. Consider an example case in which one macroblock from each region is forced intra-coded. Since there are a total of 4 regions, a total of 4 macroblocks per coded frame will be forced intra-coded. The macroblock access arrays are accessed sequentially one element at a time. Once the respective macroblock has been forced intra-coded, the next element of the array is accessed for the next coded frame. Following this strategy, all the macroblocks in Region1 and Region2 will have been forced intra-coded within 32 coded frames; all the macroblocks in Region3 will have been forced intra within 18 coded frames; and, all the macroblocks in Region4 will have been forced intra within 17 coded frames.

Generalizing the above example, a picture may be partitioned into L image regions. N macroblocks from each region may be forced intra-coded. Therefore, a total of (L×N) macroblocks will be forced intra-coded in each frame. This requires a set of L pseudo-random arrays to be sequentially accessed N elements at a time for each coded frame. The set of macroblock locations that are to be intra-coded for a specific frame is stored in memory for identifying a macroblock to be intra-coded. If the largest region contains mbCount macroblocks and the coding specification calls for each block to be refreshed at least every refreshInterval frames, then N and mbCount must together satisfy $$N \times refreshInterval > mbCount - 1.$$

Figure 5:
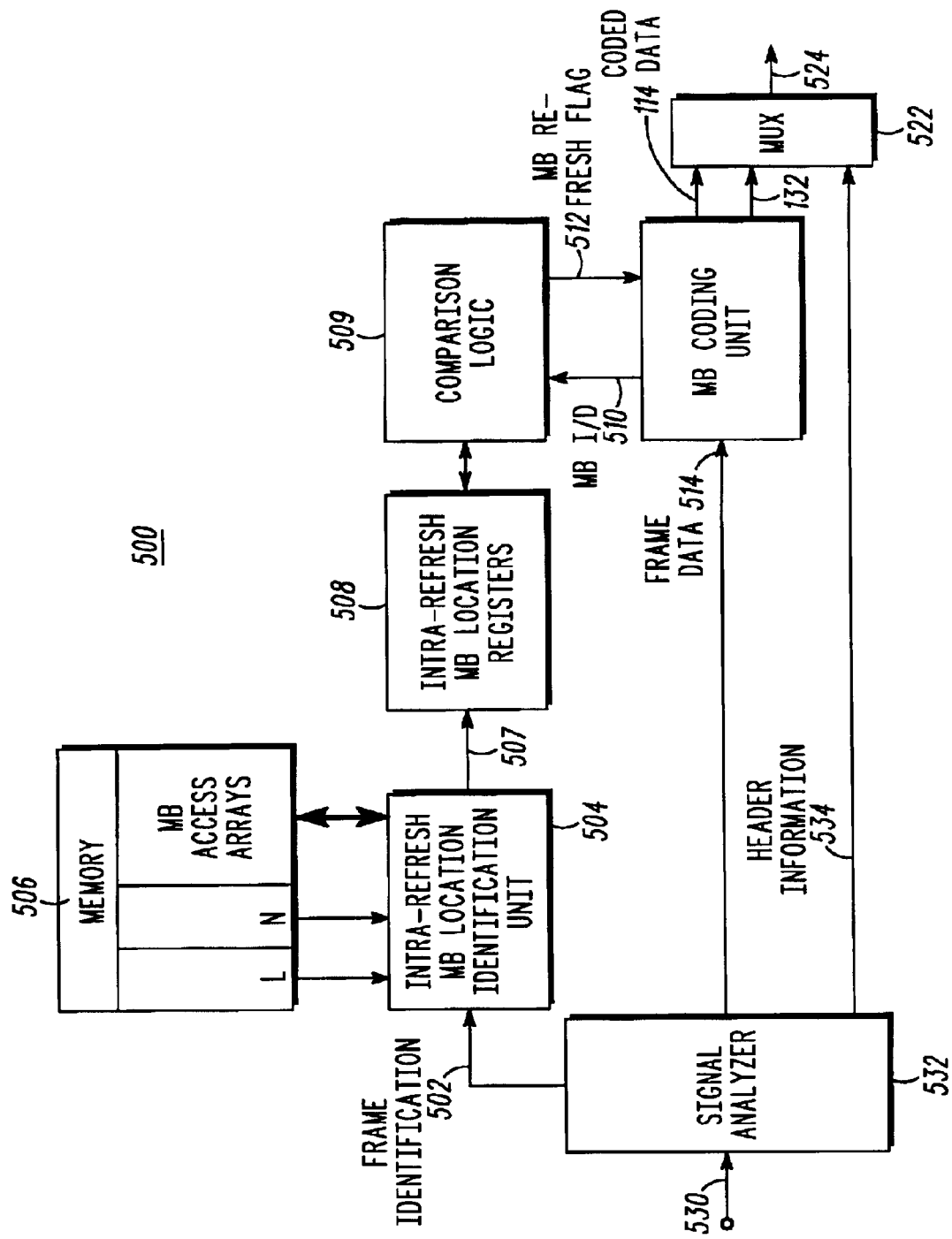
FIG. 5 shows a block diagram of a video coding system with random, forced, intra-refresh coding of macroblocks according to one embodiment of the invention.

FIG. 5 shows a system block diagram of a video coding system 500 with random, forced, intra-refresh coding of macroblocks according to one embodiment of the invention. Input video signal 530 is provided to signal analyzer 532, which determines frame identification information 502, frame data 514 and header information 534. Intra-refresh MB location identifier 504 determines the macroblock locations within the frame that are to be forced intra-coded. The location identifier 504 uses frame identification information 502 together with pre-defined data, stored in memory 506, corresponding to the picture size. These data include the number of image regions, L, a pre-defined set of L macroblock (MB) Access Arrays and the number, N, of elements to be intra-refreshed in each region. The MB Access Arrays are accessed N elements at a time for each frame. The identified macroblock locations 507 are stored in location registers in block 508 and used during processing of all macroblocks in the current frame. The MB coding unit 520 operates on the frame data 514 and is configured as an inter-coder (100 in FIG. 1) or as an intra-coder (300 in FIG. 3) according to the value of the MB intra-refresh flag 512. The MB information 510, which includes the location of the macroblock to be coded, is passed to block 509 where comparison logic is used to determine if the macroblock is to be intra-coded by comparing its location to those stored in the location registers 508. If the macroblock identifier corresponds to a forced intra-coded macroblock location, the macroblock Intra-refresh flag 512 will be set. This will force the macroblock coding unit 520 to intra-code the macroblock. The coded coefficient data 114 and the coded motion vector 132 is combined in multiplexer 522 with header information 534 to produces the bit-stream output 524.

Figure 6:
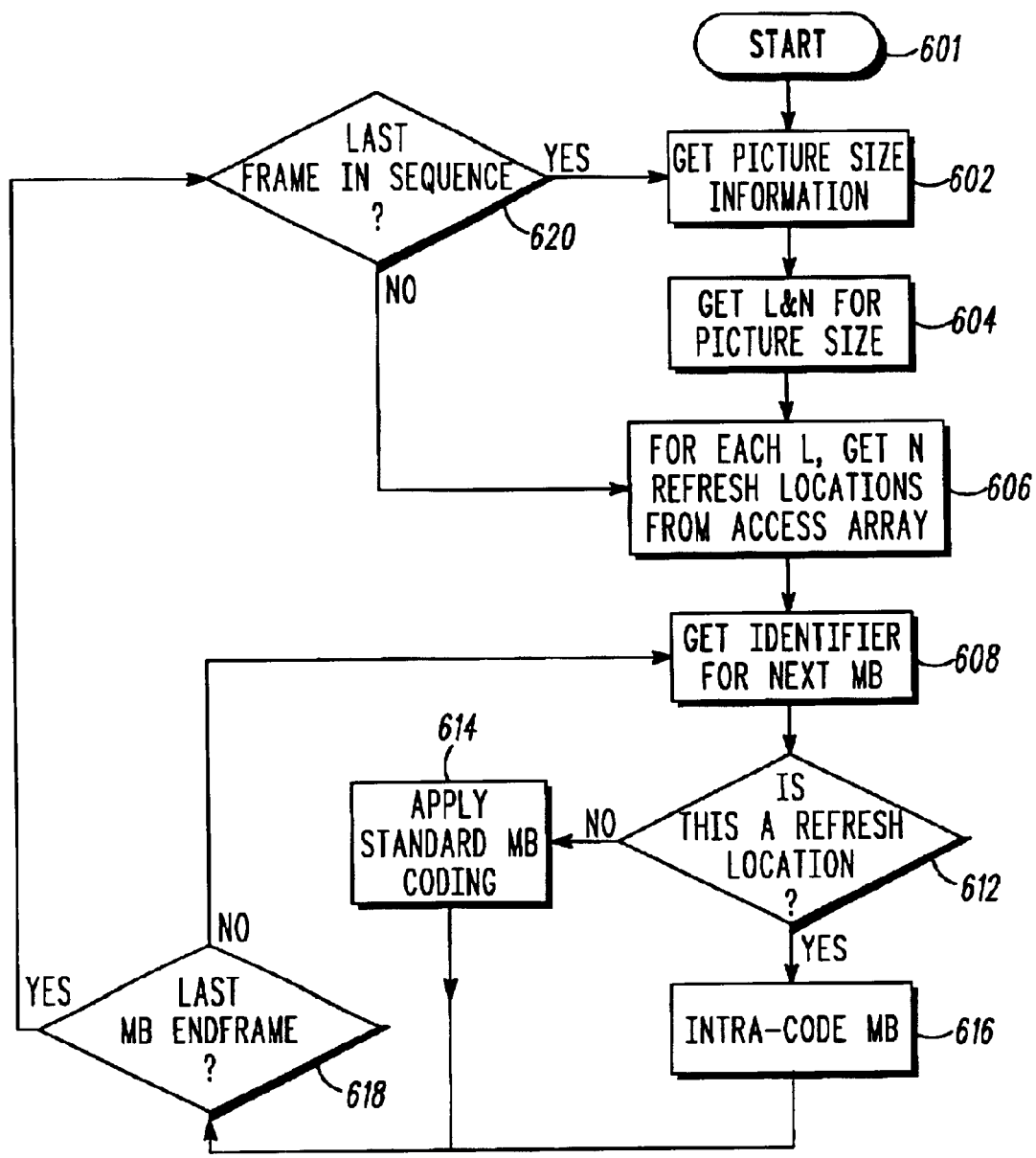
FIG. 6 shows a flow chart of a method for video coding using random, forced, intra-refresh coding of macroblocks according to one embodiment of the invention.

The selection of the locations to the forced intra-coded is now described in more detail for a preferred embodiment with reference to FIG. 6. FIG. 6 shows flow chart of one embodiment of the method of the invention. After start block 601, the picture size and other information for the current sequence of frames are retrieved at block 602. According to the picture size, the number of regions, L, and the number of intra-coded macroblocks, N, in each region is read from memory at block 604. For each of the L regions, the N refresh location identifiers are read from the MB access arrays at block 606. The arrays are accessed in a circular manner. In an alternate embodiment the refresh locations are determined by determined using a pseudo-random number generator. This reduces the memory requirement, but increases the computation requirement. The identifier of the next macroblock to be coded is retrieved at block 608. At decision block 612 comparison logic is used to determine if the macroblock is to be forced refreshed. If not, as depicted by the negative branch from decision block 612, the standard MB coding is applied at block 614. This may be intra- or inter-coded according to the position of macroblock within the picture and the order of the picture within the sequence of pictures. If the macroblock is to be forced intra-coded, as depicted by the positive branch from decision block 612, intra-coding is applied at block 616. At decision block 618 a check is made to determine if this is the last block in the frame. If not, as depicted by the negative branch from decision block 618, the identifier of the next macroblock to be coded is obtained at block 608. If the macroblock was the last in the frame, as depicted by the positive branch from decision block 618, a check is made at decision block 620 to determine if the frame was the last frame in the current sequence. If not, as depicted by the negative branch from decision block 620, flow continues from block 606 and the next N refresh location identifiers are obtained from the MB access arrays. If the current frame was the last in the sequence, as depicted by the positive branch from decision block 620, flow continues from block 602, and the picture size information for the next sequence of pictures is obtained.

A pseudo-code description of one embodiment of the method is given below.

```
/* INITIALIZATION */
for each of L regions
    Initialize ArrayPointer[region] to start of array
    get R[region] = random permutation of blocks in the region
    for each block
        initialize AccessArray[region][block] = R[region][block]
    next block
next region
/* FRAME PROCESSING */
/* set flags */
```

```
for each frame
    for each block
        set Flag[block] to FALSE
    next block
    for each of L regions
        for each of N locations
            get BlockPosition =
                AccessArray[region][ArrayPointer[region]]
            set Flag[BlockPosition] to TRUE
            increment ArrayPointer[region] by one,
                        modulo the size of the region
        next location
    next region
    /* code macroblocks */
    for each block
        if Flag[block]
            intra-code the block
        else
            code block as normal
        end
    next block
next frame
```

Figure 7:
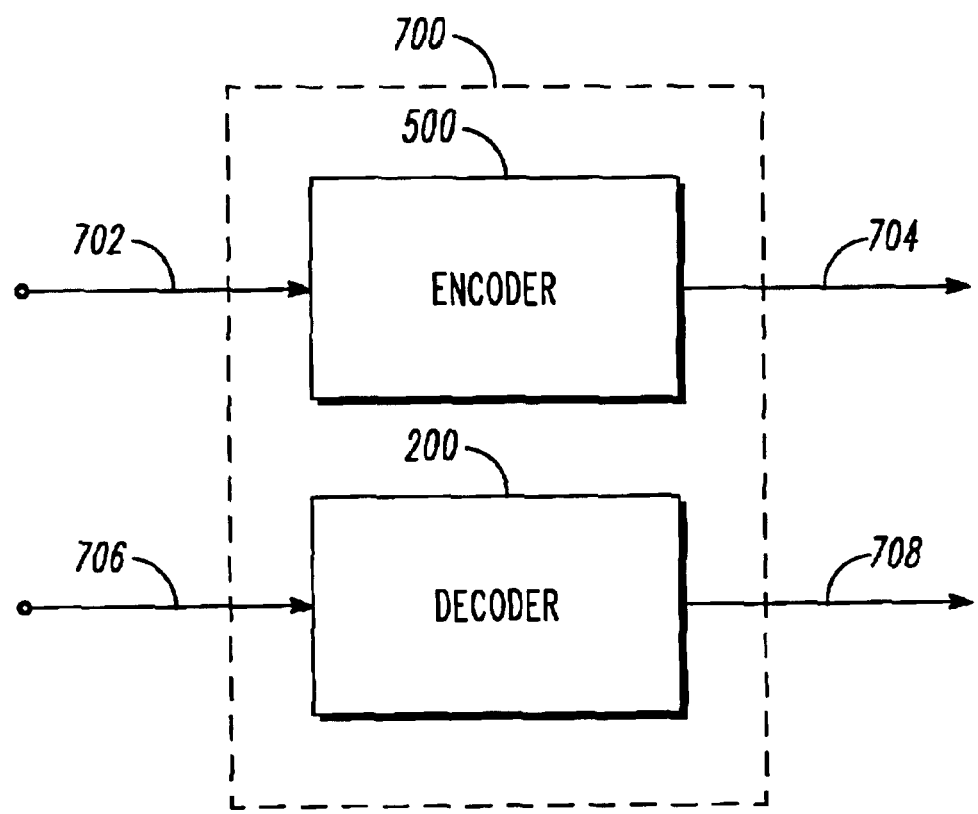
FIG. 7 shows a video CODEC in accordance with one embodiment of the present invention.

Some operations are common to both the coder and the decoder. Accordingly, the coder and decoder are often combined in a CODEC (coder/decoder) as shown in FIG. 7. The CODEC may be implemented in software as a program running on a computer. Alternatively, the CODEC may be implemented as device, such as semiconductor device, controlled by a computer program stored in a memory; an application specific integrated circuit, a digital signal processor or a field programmable gate array. Referring to FIG. 7, CODEC 700 comprises encoder 500, which receives a video signal on input 702 and produces an encoded digital video signal on output 704, and decoder 200 which receives an encoded digital video signal on input 706 and produces a decoded video signal on output 708. The CODEC may be configured to both encode and decode simultaneously or may be configured so that elements common to both the encoder and the decoder are shared.

The preferred embodiment has focused on a specific example of coding a QCIF size video with a set of four spatial regions. Generally, this method can be used on any size video image with any number of spatial regions. According to the invention, N macroblocks in pre-defined spatial image regions are chosen at random to be intra-coded. The random nature of the intra-refresh pattern provides a more visually pleasing forced intra-coding method.

It will be apparent to those of ordinary skill in the art that the above described method may be easily extended to specify a different number of macroblocks to be randomly intra-coded for each spatial image region. The combination of the number of macroblocks comprising a spatial image region and the number of macroblocks updated in each spatial region for each coded frame defines the refresh rate for that spatial region.

The disclosed random macroblock intra refresh strategy provides a low complexity method of encoder-based error containment. As such, channel errors exhibiting themselves as visual artifacts in the decoder are constrained from propagating the errors into future reconstructed frames. Furthermore, the method of randomly forcing intra-coded macroblocks provides a more visually pleasing refresh method. The random nature of the refresh macroblock location prevents the human visual system to cue and track regular image quality discontinuities.

This method of randomly intra-refreshing method is applicable to all block-based video CODECs including those specified by international standards (e.g., H.261, H.263, MPEG1, MPEG2, and MPEG4). The system may be used in a variety of applications. The coder may be implemented in software on a portable device and may incorporated in a semiconductor device.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A system for forced intra-coding of a digital video signal composed of a sequence of image frames that comprise an entire image, each image frame comprising a plurality of macroblocks of pixels, said system comprising:
    an input for receiving an image frame of the digital video signal;
    a first memory for storing one or more macroblock access arrays, each macroblock access array containing a list of macroblock identifiers corresponding to macroblock locations within a predetermined region of the image frame;
    an intra-refresh macroblock location identification element, operably connected to said first memory, for selecting one or more macroblock refresh identifiers from said one or more macroblock access arrays;
    comparison logic for comparing said macroblock refresh identifiers with an identifier of a current macroblock; and
    a block-based coding element, operably connected to said comparison logic and to said input,
    wherein said block-based coding element is operable to force intra-coding of said current macroblock if the identifier of the current macroblock is equal to any of the one or more macroblock refresh identifiers.

2. A system as in claim 1 wherein at least one list of macroblock identifiers is a random permutation of the identifiers of macroblock locations within a corresponding predetermined region of the image frame.

3. A system as in claim 1, further comprising a second memory for storing said macroblock refresh identifiers.

4. A system as in claim 1, further comprising a second memory for storing an array of flags, one flag for each macroblock location, wherein said intra-refresh macroblock location identification element operates to set one or more flags within the array of flags that correspond to said macroblock refresh identifiers.

5. A system as in claim 4, wherein said block-based coding element is configured to force the current macroblock to be intra-coded if a corresponding flag within said array of flags is set.

6. A system as in claim 1, wherein said intra-refresh macroblock location identification element is operably connected to said input and is configured to select the one or more macroblock refresh identifiers whenever a new image frame is received by said input.

7. A system as in claim 1, wherein the digital video signal is spatially partitioned into one or more image regions covering the entire image.

8. A system as in claim 7, wherein the digital video signal is spatially partitioned into one or more mutually exclusive image regions.

9. A system as in claim 8, wherein the digital video signal is spatially partitioned into a plurality of mutually exclusive image regions comprising at least one interior image region containing no macroblock on an edge of the image frame and at least one exterior image region containing at least one macroblock on the edge of the image frame.

10. A system as in claim 9 wherein the at least one interior image region contains fewer macroblocks than the at least one exterior image region.

11. A system as in claim 8, wherein each boundary of the one or more mutually exclusive image regions is coincident with a macroblock boundary.

12. A system as in claim 7, wherein one or more of the one or more image regions are overlapping.

13. A system as in claim 1, wherein said block-based coding element is operable to code said current macroblock according to a standard video coding protocol if the identifier of the current macroblock is not equal to any of the one or more macroblock refresh identifiers.

14. A device for coding digital video data of a digital image, comprising:

a first input for receiving uncompressed digital video data;

a first output for transmitting compressed digital video data;

a memory for storing one or more macroblock access arrays, each macroblock access array of the one or more macroblock access arrays containing a list of macroblock identifiers corresponding to a plurality of macroblock locations within a predetermined region of the digital image;

an intra-refresh macroblock location identification element, operably connected to said memory, for selecting one or more macroblock refresh identifiers from said one or more macroblock access arrays;

comparison logic for comparing said macroblock refresh identifiers with an identifier of a current macroblock; and a block-based coding element, operably coupled to said comparison logic, said first input and said first output, wherein said block-based coding element is operable to force intra-coding of said current macroblock if the identifier of the current macroblock is equal to any of the one or more macroblock refresh identifiers.

15. A device as in claim 14 further comprising:

a second input for receiving compressed digital video data;

a second output for transmitting uncompressed digital video data; and a block-based decoding element operably coupled to said second input and said second output, wherein said block-based decoding element operates to decode the compressed digital video data and thereby recover the uncompressed digital video data.

* * * * *